Patented Apr. 20, 1948

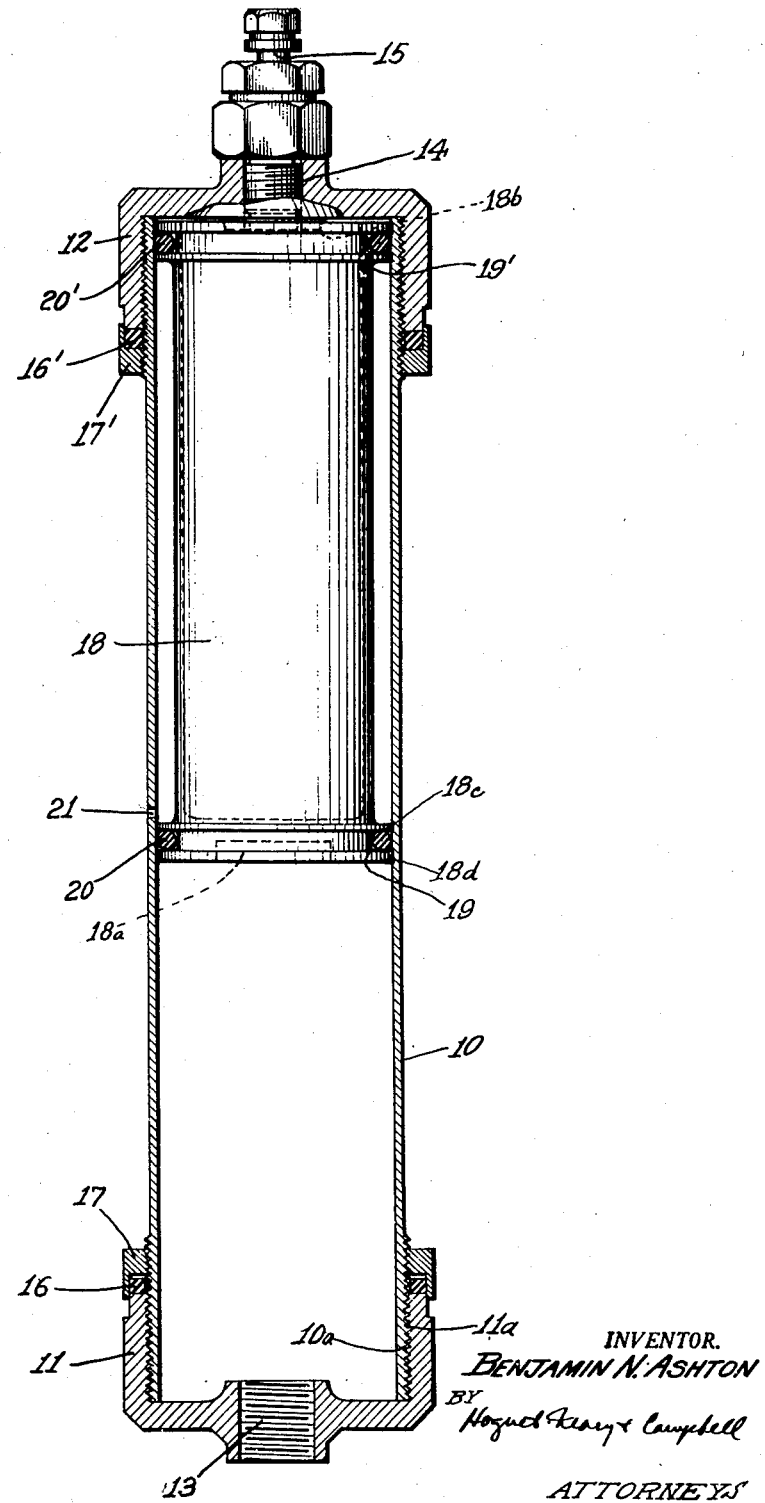

2,440,065

UNITED STATES PATENT OFFICE 2,440,065

PISTON TYPE ACCUMULATOR

Benjamin N. Ashton, Kingston, N. Y., assignor to Electrol Incorporated, Kingston, N. Y., a corporation of Delaware Application October 27, 1944, Serial No. 560,703

3 Claims. (Cl. 138—31)

This invention relates to improvements in accumulators of the type used in hydraulic systems of aircraft, for example, and which are used for absorbing hydraulic shock and accumulating a reserve of the liquid so that the pressure in the system is maintained more closely within predetermined pressure limits.

Accumulators for hydraulic systems include a tank or receptacle having a diaphragm therein dividing the tank into a gas pressure chamber and a liquid receiving chamber that is connected to the hydraulic system. The diaphragm is expanded and contracted by the liquid pressure in the hydraulic system to vary the capacity of the chamber.

Such accumulators are susceptible to damage by excessive air or liquid pressure therein. Thus, for example, if the hydraulic system is damaged and there is a sudden drop in the pressure of the liquid therein, the air or gas pressure in the accumulator will expand and rupture the diaphragm. The same result may occur, if the pressure in the system increases to a higher than desired value or the gas in the accumulator escapes. Moreover, the diaphragms, because they are constantly subjected to flexing and change of position, will become weakened and will leak, thereby allowing the gas and liquid to mix and rendering the accumulator ineffective to perform its intended functions.

An object of the present invention is to provide an accumulator which does not include a flexible diaphragm or bellows and in which the sudden variations in pressures or a large pressure differential in the liquid and gas chambers will not damage the accumulator.

Another object of the invention is to provide an accumulator having a shiftable piston therein in which the sealing elements or rings of the piston are subjected to pressure at all times in order to maintain them in tight sealing engagement with the piston and the walls of the accumulator receptacle.

Other objects of the invention will become apparent from the following description of a typical form of accumulator embodying the present invention.

In accordance with the invention, a typical form of accumulator may include a cylinder having an elongated piston therein which is shiftable axially of the cylinder and divides the cylinder into a variable capacity gas receiving chamber and a variable capacity chamber for receiving liquid from the hydraulic system.

More particularly, the above described accumulator is provided with toroidal rubbery rings at opposite ends of the piston which effect sealing engagement between the piston and the inner walls of the cylinder.

The sealing rings require unequal pressures on opposite sides thereof in order to provide an effective seal.

If gas or liquid pressures are in equilibrium, there is a tendency for the gas to leak past the piston and the rings, thereby equalizing the pressures on both sides of all of the sealing rings, with the result that the rings no longer provide an effective seal.

In order to maintain an effective seal between the piston and the cylinder, the cylinder is provided with one or more vents at substantially its midportion, and the piston is made sufficiently long that in all of its positions within the cylinder, the vent or vents are disposed between the sealing rings.

With this arrangement, the outer sides of the sealing rings adjacent the gas pressure chamber at the one end and the liquid receiving chamber at the other end are subjected to the pressures in these chambers, whereas the opposite sides of the ring are subjected to atmospheric pressure. Under these conditions, the rings are compressed tightly against the wall of the cylinder and against the piston, thereby providing a most effective seal.

For a better understanding of the present invention, reference might be had to the accompanying drawing in which the single figure is a view in vertical section of a typical form of accumulator embodying the present invention.

The form of accumulator chosen to illustrate the present invention may suitably include an elongated hollow tubular cylinder member 10 which is provided with closure caps 11 and 12 at its opposite ends. The closure cap 11 is of cup-shaped form and is provided with internal threads 11a which receive the threaded end 10a on the cylinder. The cap is provided with a centrally located port 13 therein through which liquid from a hydraulic system can be delivered to the interior of the cylinder.

The cap 12 is similar to the cap 11, being threaded on the end of the cylinder 10 and provided with a port 14. Mounted in the port 14 is a conventional gas check valve 15 through which gas under pressure can be introduced into the interior of the cylinder. Both of the caps 11 and 12 may be maintained in sealing engagement with the wall of the cylinder 10 by means of the packings 16, 16' and the rings 17, 17' for compressing the packings which are threaded on the exterior of the cylinder 10.

Mounted within the cylinder 10 and slidable axially thereof is an elongated piston 18, which, as illustrated, is slightly more than one-half the length of the interior of the cylinder. The piston 18 may be hollow in order to decrease its weight and its ends are provided with the recesses 18a and 18b in order to receive the bosses in the caps 11 and 12 respectively.

The piston may be substantially the same diameter as the internal diameter of the cylinder. However, it is preferred to make it somewhat smaller than the diameter of the cylinder in order to reduce the weight of the piston.

One end of the piston is provided with a pair of spaced apart flanges 18c and 18d defining a peripheral groove 19 in which is received a rubbery, toroidal ring 20. The ring 20 preferably is of slightly greater diameter than the depth of the groove 19, so that it will tend to engage at all times the inner wall of the cylinder 10. The other end of the cylinder is provided also with a similar groove 19' for receiving a sealing ring 20'. The spacing between the grooves 19 and 19' at the opposite ends of the piston is slightly greater than one-half the length of the cylinder.

The accumulator construction thus far described would not be satisfactory under continuous service conditions for the reason that some leakage unavoidably would take place past the rings 20, 20' at opposite ends of the cylinder. Under these conditions, the pressure on opposite sides of the rings 20, 20' would in time become equalized, with the result that the rings would no longer provide an effective seal.

It is a characteristic of the sealing rings 20, 20' that they function best when they are subjected to large pressure differentials. The pressure acting on one side of the ring tends to compress it, with the result that it is forced tightly into engagement with the piston and the cylinder wall. The sealing efficiency of the ring increases as the pressure differential increases.

In order to assure a strong and positive seal at opposite ends of the piston 18, the wall of the cylinder 10 is provided with one or more vents 21 which connect the interior of the cylinder with the atmosphere. Inasmuch as the pressure exerted on opposite ends of the piston may be as high as 2,000 pounds per square inch, the sealing rings 20, 20' will be subjected to this pressure in one direction and only to atmospheric pressure in the opposite direction, with the result that a very strong, substantially leakproof seal will be provided by the rings 20, 20'.

It will be understood that the accumulator may be made of any desired size and that the dimensions of the piston will be varied accordingly; the only requirement, in so far as the piston is concerned, is that the sealing rings 20, 20' are spaced apart a sufficient distance that the vent is disposed between these rings in all positions of the piston.

Inasmuch as the accumulator is susceptible to considerable modification without departing from the invention, it will be understood that the form of the invention described above is illustrative only and should not be considered as limiting the scope of the following claims.

I claim:

1. An accumulator for hydraulic systems comprising a cylinder having closures at its opposite ends, means at one end of said cylinder for connecting said cylinder to a hydraulic system, a gas check valve at the opposite end of said cylinder, means forming a vent to atmosphere in the side of said cylinder substantially midway between its ends, an elongated piston slidable in said cylinder, and toroidal, rubbery sealing rings mounted on said piston adjacent its ends and engaging the cylinder walls on opposite sides of said vent in all positions of said piston.

2. An accumulator comprising a hollow, tubular cylinder of substantially uniform internal diameter having a vent substantially in its midportion, closure caps on the ends of said cylinder, an elongated piston slidable axially of said cylinder and having a peripheral groove adjacent each end, compressible sealing rings of circular cross-section in said grooves engageable with the interior of said cylinder on opposite sides of said vent in all positions of said piston in said cylinder, a gas check valve in one of said caps permitting introduction of gas under pressure into said cylinder, and a coupling in the other cap for connecting the cylinder to a hydraulic system.

3. An accumulator comprising a hollow, tubular cylinder of substantially uniform internal diameter having a vent substantially in its midportion, closure caps on the ends of said cylinder, an elongated piston slidable axially of said cylinder and having a peripheral groove adjacent each end, toroidal, rubbery sealing rings in said grooves engageable with the interior of said cylinder on opposite sides of said vent in all positions of said piston in said cylinder, a gas check valve in one of said caps permitting introduction of gas under pressure into said cylinder, and a coupling in the other cap for connecting the cylinder to a hydraulic system.

BENJAMIN N. ASHTON.

REFERENCES CITED

The following references are of record in the file of this patent:

UNITED STATES PATENTS

| Number | Name | Date |
| --- | --- | --- |
| 359,315 | Cregier | Mar. 15, 1887 |
| 1,035,386 | Prescott et al. | Aug. 13, 1912 |
| 1,849,702 | Bard | Mar. 15, 1932 |
| 2,115,383 | Christensen | Apr. 26, 1938 |
| 2,150,529 | Tremolada | Mar. 14, 1939 |
| 2,208,620 | Baisch | July 23, 1940 |